United States Patent [19]

Kukolja et al.

[11] 3,920,696

[45] Nov. 18, 1975

[54] 2S-CARBOXYALKYLTHIO-3R-IMIDOAZETIDIN-4-ONES AND COMPOUNDS USEFUL IN THEIR PREPARATION

[75] Inventors: Stjepan P. Kukolja, Indianapolis; Steven R. Lammert, Greenwood, both of Ind.

[73] Assignee: Eli Lilly and Company, Indianapolis, Ind.

[22] Filed: Apr. 2, 1973

[21] Appl. No.: 347,276

[52] U.S. Cl. ...... 260/326 S; 260/326 N; 260/239 A; 424/274
[51] Int. Cl.² ............... C07D 205/08; C07D 209/48
[58] Field of Search ......... 260/326 N, 326 S, 239 A

[56] References Cited
UNITED STATES PATENTS

| | | | |
|---|---|---|---|
| 3,487,070 | 12/1969 | Sheehan | 260/326 S |
| 3,487,071 | 12/1969 | Sheehan | 260/326 S |
| 3,487,090 | 12/1969 | Sheehan | 260/326 S |
| 3,801,567 | 4/1974 | Heusler | 260/239 A |
| 3,842,072 | 10/1974 | Heusler | 260/239 A |

FOREIGN PATENTS OR APPLICATIONS

| | | | |
|---|---|---|---|
| 2,127,285 | 3/1971 | Germany | 260/239 E |

OTHER PUBLICATIONS

Sheehan et al., J.A.C.S. 95, 3064, (1973).
Goodman et al., "Pharmacological Basis of Therapeutics," (1965), p. 17.
S. Wolf et al., Can. J. Chem. 50, 2894–2898, (1972).
Ibid, p. 2898–2902.
Ibid, p. 2902–2905.

*Primary Examiner*—Donald G. Daus
*Assistant Examiner*—Mark L. Berch
*Attorney, Agent, or Firm*—William C. Martens, Jr.; Everet F. Smith

[57] ABSTRACT

2S-Carboxyalkylthio-3R-imidoazetidin-4-ones can be prepared by the sequential conversion of 2-halo-1[1'-(protected)carboxy-2'-methylprop-1'-enyl]-3R-imidoazetidin-4-ones to 2-halo-1-(protected)carboxyoxalyl-3R-imidoazetidin-4-ones, which are converted to 2-halo-3R-imidoazetidin-4-ones, which are converted to 2S-(protected)carboxyalkylthio-3R-imidoazetidin-4-ones, which are converted to the title compounds. The title compounds exhibit antibacterial activity.

16 Claims, No Drawings

2S-CARBOXYALKYLTHIO-3R-IMIDOAZETIDIN-4-ONES AND COMPOUNDS USEFUL IN THEIR PREPARATION

BACKGROUND OF THE INVENTION

This invention is directed to novel compounds exhibiting antibiotic activity as well as to compounds useful as intermediates in the preparation of the antibiotically active compounds.

Compounds having the following structure

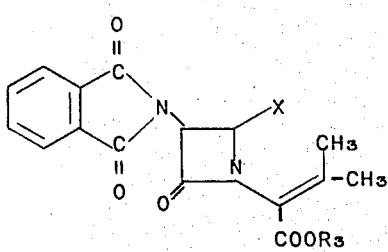

I in which $R_3$ represents a carboxy protecting group; and X represents chlorine or bromine, can be used as starting materials in the preparation of the compounds of this invention.

Compounds having the structure of Formula I can be prepared by treatment of the corresponding 6-phthalimido penicillin ester with an electrophilic reagent, that is, one which seeks electrons. The bond between the sulfur and the carbon is the 5-position of the penicillin is selectively cleaved by treatment of the penicillin with an electrophilic reagent which serves as a source of positive halogen.

The term "source of positive halogen" refers to a positive chlorine or a positive bromine ion. A wide variety of halogenating agents are available for the supply of positive halogen. Representative suitable halogenating agents are the elemental halogens, such as chlorine and bromine, sulfuryl chloride, sulfuryl bromide, N-halogeno amides and imides, such as N-chlorosuccinimide, N-bromosuccinimide, N,N'-dibromohydantoins and organic hypohalides and particularly the alkanoyl hypohalides, such as acetyl hypochloride, propionyl hypochloride, butyryl hypochloride, acetyl hypobromide, propionyl hypobromide, butyryl hypobromide, and the like. Additionally, use can be made of mixed halogens such as BrCl, ClI, BrI, and the like. The reaction of the 6-phthalimido penicillin ester and the source of positive halogen preferably is carried out in the presence of an aprotic solvent, that is, a solvent which does not offer or accept protons. Preferably, the reaction is carried out at a temperature within the range of from about −76°C. to about 80°C. The mole ratio of the source of positive halogen to the penicillin ester ranges from about 1.5:1 to about 3.0:1 or higher. The product (Formula I) can be isolated in accordance with readily recognized techniques.

SUMMARY OF THE INVENTION

Broadly, this invention relates to compounds of the formula

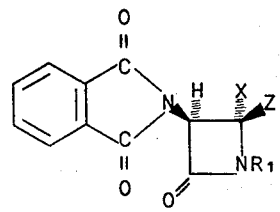

in which $R_1$ is hydrogen or a group of the formula

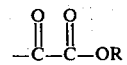

in which
R is a carboxy protecting group;
Z is hydrogen, chlorine, or bromine; and
X is hydrogen, chlorine, bromine, or a group of the formula

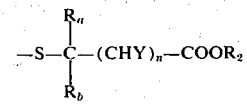

in which $R_a$ and $R_b$ independently are hydrogen or methyl, Y is acetamido or hydroxyl, n is zero or 1, and $R_2$ is hydrogen or a carboxy protecting group readily cleavable by known deesterification procedures; with the limitation that one of X and Z is hydrogen, and, with the further limitation that, when $R_1$ is

one of X and Z is chlorine or bromine.

Compounds useful as intermediates in accordance with this invention are those of the formula

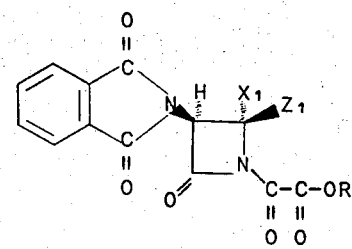

in which R is a carboxy protecting group, and $X_1$ and $Z_1$ are hydrogen, chlorine, or bromine, with the limitation that one of $X_1$ and $Z_1$ is hydrogen.

Other compounds of this invention useful as intermediates to the preparation of active antibiotics are those of the formula

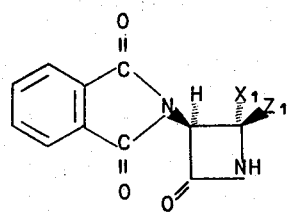

in which $X_1$ and $Z_1$ are hydrogen, chlorine, or bromine, with the limitation that one of $X_1$ and $Z_1$ is hydrogen.

Further compounds of this invention, some of which are active antibiotics and others of which are useful as intermediates in the production of active antibiotics are those of the formula

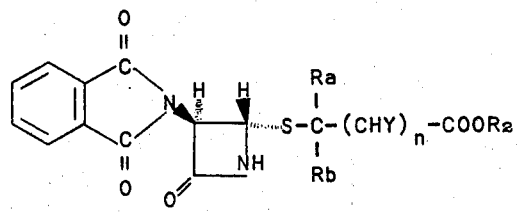

in which $R_a$ and $R_b$ independently are hydrogen or methyl, Y is acetamido or hydroxyl, $n$ is zero or 1, and $R_2$ is hydrogen or a carboxy protecting group readily cleavable by known deesterification procedures.

The antibiotically active compounds of the above formula are those in which $R_2$ is hydrogen. When $R_2$ is other than hydrogen, the thus-defined compounds are useful as intermediates in the preparation of the antibiotically active compounds. The active compounds are easily obtainable by cleavage of the carboxy protecting group to produce a compound in which $R_2$ is hydrogen.

DETAILED DESCRIPTION OF THE INVENTION

Certain of the compounds of this invention can be designated 2-halo-1-(protected)carboxyoxalyl-3R-phthalimido-azetidin-4-ones, and have the formula

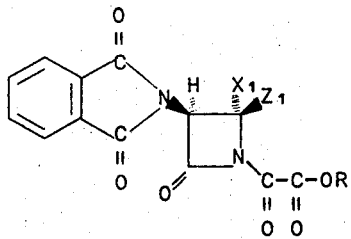

in which R is a carboxy protecting group, and $X_1$ and $Z_1$ are hydrogen, chlorine, or bromine, with the limitation that one of $X_1$ and $Z_1$ is hydrogen.

These compounds can be prepared from the corresponding compounds having the formula

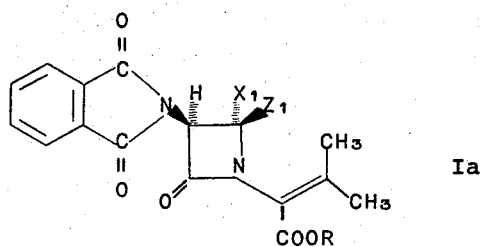

in which R, $X_1$, and $Z_1$ are as hereinabove defined.

Compounds of Formula Ia are available in accordance with the method hereinbefore described.

As indicated hereinabove, R designates a carboxy-protecting group, in other words, the residue of an ester-forming alcohol. Since this invention does not contemplate the cleavage of the ester function to produce compounds in which R is hydrogen, the carboxy-protecting group which is represented by R can be any of a wide variety of well known functions. Preferably, however, R represents a group such as $C_1$ to $C_4$ alkyl, 2,2,2-trihaloethyl, benzyl, p-nitrobenzyl, p-methoxybenzyl, benzhydryl, phthalimidomethyl, succinimidomethyl, phenacyl, p-halophenacyl, $C_2$ to $C_6$ alkanoyloxymethyl, and the like. More preferably, R is methyl, t-butyl, benzyl, p-nitrobenzyl, p-methoxybenzyl, benzhydryl, or 2,2,2-trichloroehtyl.

In preparing the oxalyl compounds of this invention, a compound of formula Ia is reacted with ozone to achieve oxidative cleavage of the internal double bond by the formation of an ozonide intermediate.

Typically, this conversion is achieved by dissolving the compound of formula Ia in a suitable inert solvent. Such solvent must be one which is itself unreactive to the highly reactive ozone. Typical such unreactive solvents include, for example, chlorinated non-aromatic solvents such as methylene chloride, methylene bromide, chloroform, bromoform, methyl chloride, methyl bromide, dichloroethane, dibromoethane, and the like. The compound of formula Ia, dissolved in a suitable solvent, is maintained at the temperature of reaction, typically at from about room temperature to about $-76°C.$, and preferably at from about $-10°C.$ to about $-76°C.$ The ozone is then bubbled into the solution maintained at the desired reaction temperature. The addition of ozone is continued until analysis of the reaction mixture indicates the absence of any starting material. This can be determined, for example, by thin-layer chromatography (TLC) examination of a sample of the reaction mixture. Typically, the reaction will be completed within a period of from about 30 minutes to about 8 hours, and more generally within from about 1 to about 3 hours. The time of reaction, of course, will depend upon the relative amounts of reactants which are employed, the particular structure of the R group in the starting material, and the selected reaction temperature.

Once the formation of the ozonide intermediate is complete, the ozonide as well as any excess ozone is decomposed by treatment of the reaction mixture with a reducing agent. Any of several reducing agents can be employed, such as, for example, sodium bisulfite, sulphur dioxide, sodium iodide in acetic acid followed by sodium thiosulfate, standard direct hydrogenation, and the like. Preferably, however, sodium bisulfite is employed by reason of its relatively low cost and convenience of use. The reaction mixture typically can be treated with an aqueous solution of sodium bisulfite. This treatment will accomplish the desired decomposition of the ozonide intermediate to produce the oxalyl product. The product can be recovered from the reaction mixture in accordance with generally practiced techniques.

Typical examples of oxalyl compounds of this invention include the following:

2-chloro-1-methoxyoxalyl-3R-phthalimidoazetidin-4-one;
2-bromo-1-methoxyoxalyl-3R-phthalimidoazetidin-4-one;
2-chloro-1-isopropyloxyoxalyl-3R-phthalimidoazetidin-4-one;
2-bromo-1-isopropyloxyoxalyl-3R-phthalimidoazetidin-4-one;
2-chloro-1-t-butyloxyoxalyl-3R-phthalimidoazetidin-4-one;

2-bromo-1-t-butyloxyoxalyl-3R-phthalimidoazetidin-4-one;
2-chloro-1-benzyloxyoxalyl-3R-phthalimidoazetidin-4-one;
2-bromo-1-benzyloxyoxalyl-3R-phthalimidoazetidin-4-one;
2-chloro-1-p-nitrobenzyloxyoxalyl-3R-phthalimidoazetidin-4-one;
2-bromo-1-p-nitrobenzyloxyoxalyl-3R-phthalimidoazetidin-4-one;
2-chloro-1-p-methoxybenzyloxyoxalyl-3R-phthalimidoazetidin-4-one;
2-bromo-1-p-methoxybenzyloxyoxalyl-3R-phthalimidoazetidin-4-one;
2-chloro-1-benzhydryloxyoxalyl-3R-phthalimidoazetidin-4-one;
2-bromo-1-benzhydryloxyoxalyl-3R-phthalimidoazetidin-4-one;
2-chloro-1-(2',2',2'-trichloroethoxy)oxalyl-3R-phthalimidoazetidin-4-one;
2-bromo-1-(2',2',2'-trichloroethoxy)oxalyl-3R-phthalimidoazetidin-4-one;
2-chloro-1-acetoxymethoxyoxalyl-3R-phthalimidoazetidin-4-one;
2-bromo-1-acetoxymethoxyoxalyl-3R-phthalimidoazetidin-4-one;
2-chloro-1-phthalimidomethoxyoxalyl-3R-phthalimidoazetidin-4-one;
2-bromo-1-succinimidomethoxyoxalyl-3R-phthalimidoazetidin-4-one;
and the like.

Haloazetidinones, preparable from the aforementioned oxalyl compounds, are also a part of this invention. These compounds are useful as intermediates in the preparation of antibiotically active compounds. The haloazetidinones have the following formula:

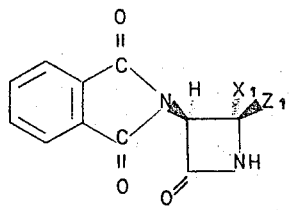

in which $X_1$ and $Z_1$ are hydrogen, chlorine, or bromine, with the limitation that one of $X_1$ and $Z_1$ is hydrogen.

Conversion of the oxalyl compounds to their respective haloazetidinone can be achieved by reacting the oxalyl compound with phenylhydrazine or a nitro-substituted phenylhydrazine, such as 2-nitrophenylhydrazine, 4-nitrophenylhydrazine, or 2,4-dinitrophenylhydrazine.

The reaction typically is carried out by treating the oxalyl compound with an equivalent quantity of the phenylhydrazine reagent in an appropriate inert solvent. Any typical solvent can be employed, including, for example, ethers, such as tetrahydrofuran (THF), ethyl ether, dioxane, and the like, aromatic hydrocarbons such as benzene, toluene, xylene, and the like; halogenated hydrocarbons, such as, methyl chloride, methyl bromide, methylene chloride, methylene bromide, chloroform, bromoform, dichloroethane, chlorobenzene, dichlorobenzene, and the like; esters, such as ethyl acetate, and the like; and various other typical available inert solvents.

The phenylhydrazine, preferably 2,4-dinitrophenylhydrazine, is mixed with the oxalyl compound in the selected solvent preferably in an amount equivalent ot the oxalyl compound, and the mixture is allowed to react at a temperature from about room temperature to about 65°C., preferably from about 40°C. to about 65°C. for a period generally from about 15 minutes to about 1 hour. The reaction time, of course, will depend upon the particular reactants which are employed as well as the temperature at which the reaction is carried out. The reaction time, thus, may vary considerably.

The phenylhydrazine reaction achieves cleavage of the oxalyl group displacing it with a hydrogen to produce the haloazetidinone structure. The cleaved portion is removable in the form of the corresponding ester of the phenylhydrazineglyoxylate. The remaining portion of the reaction mixture contains the desired product, and the product is readily separable from the reaction mixture by recognized techniques, including, for example, recrystallization, preparative chromatography, and the like.

The haloazetidinone which is formed can be either 2-chloro-3R-phthalimidoazetidin-4-one or 2-bromo-3R-phthalimidoazetidin-4-one.

The 2-halo-3R-phthalimidoazetidin-4-one can also be prepared by treating a compound of the formula

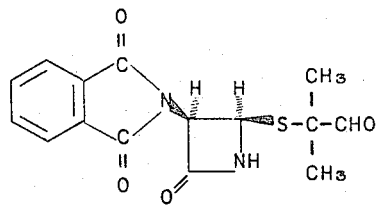

with halogen such as chlorine or bromine. The above compound, 2R-[1'-formyl-1'-(methyl)ethylthio]-3R-phthalimidoazetidin-4-one, is available from Sheehan et al., Journal of the American Chemical Society, 87, 5468 (1965). Conversion to the 2-halo compound is quite simply accomplished by treating the formyl compound in an appropriate inert solvent with a solution of the halogen which is intended to appear in the 2-halo product. The reaction preferably can be carried out at from about 0°C. to about 50°C. and more preferably at about room temperature, and is completed in from about 15 minutes to about 4 hours.

The above-described haloazetidinones can be converted to antibiotically active compounds by displacement of the halogen with a protected carboxy-containing thio radical which is then cleaved to produce a free carboxy substituent. The initial product produced by such displacement and containing the carboxy-protected substituent is part of the broad teaching of this invention, and the thereby-defined compounds are useful as intermediates in the production of the antibiotically active compounds of this invention. These compounds have the following formula:

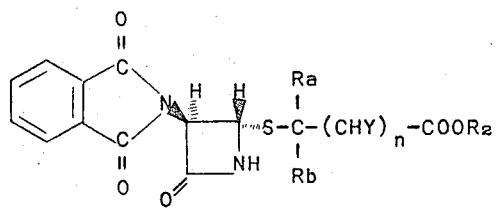

in which $R_a$ and $R_b$ independently are hydrogen or methyl, Y is acetamido or hydroxyl, n is 0 or 1, and $R_2$ is a readily removable carboxy protecting group. By "readily cleavable carboxy-protecting group" is meant one which can be easily cleaved, such as by dilute aqueous base, trifluoroacetic acid, hydrogenation in the presence of a palladium or rhodium catalyst on a suitable carrier such as carbon, barium sulfate, or alumina, or by reduction with zinc in the presence of an acid such as hydrochloric, acetic, or formic acid. A variety of such carboxy protecting groups are known for this purpose. Preferably, therefore, $R_2$ represents a group such as t-butyl, 2,2,2-trichloroethyl, benzyl, p-nitrobenzyl, p-methoxybenzyl, benzhydryl, phthalimidomethyl, phenacyl, and the like.

In achieving production of the protected-carboxy thioazetidinone compound, the haloazetidinone is reacted with a protected-carboxy mercaptan compound having the structure corresponding to the moiety intended to appear in the resulting protected-carboxy thioazetidinone product.

The displacement of the halogen by the thio substituent is accomplished by reacting the haloazetidinone with the thio moiety in the presence of a tertiary amine base. Typical tertiary amines include, for example, triethylamine, N,N-dimethylaniline, quinoline, pyridine, N-methylmorpholine, and the like.

Typically, the selected tertiary amine and the selected mercapto compound are dissolved in a suitable inert solvent, such as any of those mentioned hereinabove for use in the cleavage of the oxalyl compound. To the mixture of the tertiary amine and the mercaptan, maintained at the temperature of reaction, typically from about 0°C. to about 60°C., and preferably from about 15°C. to about 35°C. (usually room temperature), the haloazetidinone compound is added.

The reactants preferably are employed in chemically equivalent amounts, that is, a 1:1:1 ratio of the mercaptan to the tertiary amine to the haloazetidinone is employed. Use of excess tertiary amine is possible; however, avoidance of any excess is highly preferred. Also, it is possible to employ an excess of the mercaptan compound; however, any excess must be reckoned with in isolation of the resulting product. Therefore, it is highly desirable to employ equivalent amounts of the tertiary amine and the mercaptan based upon the haloazetidinone.

The displacement reaction normally is quite rapid, being completed within from about 15 minutes to about 4 hours. Most often, the reaction will be complete after about 1 hour.

The protected-carboxy thioazetidinone compound can be recovered from the reaction mixture in accordance with known techniques. Typically, these will include, for example, extraction, recrystallization, isolation by evaporation, chromatographic techniques, and the like.

Examples of the protected-carboxy thioazetidinones of this invention include:

2S[1'-(t-butyloxycarbonyl)methylthio]-3R-phthalimidoazetidin-4-one;

2S[1'-benzyloxycarbonyl)ethylthio]-3R-phthalimidoazetidin-4-one;

2S[1'-(p-nitrobenzyloxycarbonyl)ethylthio]-3R-phthalimidoazetidin-4-one;

2S-[1'-(p-methoxybenzyloxycarbonyl)-1'-(methyl)ethylthio]-3R-phthalimidoazetidin-4-one;

2S-[1',1'-(dimethyl)-2'-(acetamido)-2'-(benzhydryloxycarbonyl)ethylthio]-3R-phthalimidoazetidin-4-one;

2S-[1',1'-(dimethyl)-2'-(hydroxy)-2'-(2,2,2-trichloroethoxycarbonyl)ethylthio]-3R-phthalimidoazetidin-4-one;

2S-(acetoxymethyloxycarbonylmethylthio)-3R-phthalimidoazetidin-4-one;

2S-[1'-(phthalimidomethyloxycarbonyl)ethylthio]-3R-phthalimidoazetidin-4-one;

2S-[1'-(succinimidomethyloxycarbonyl)-1'-(methyl)ethylthio]-3R-phthalimidoazetidin-4-one;

and the like.

Antibiotically active compounds of this invention are available by cleavage of the carboxy-protecting group from the protected-carboxy thioazetidinones described hereinabove. As previously mentioned, the protected carboxy function can be selectively cleaved from the thioazetidinones by techniques well known in the art. The resulting compounds have the following structure:

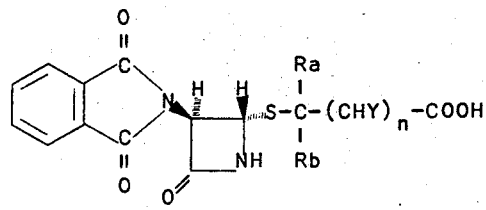

The groups $R_a$, $R_b$, Y, and n, are defined as indicated hereinabove, and typical such compounds include the following:

2S-(carboxymethylthio)-3R-phthalimidoazetidin-4-one;

2S-[1'-(carboxy)ethylthio]-3R-phthalimidoazetidin-4-one;

2S-[1'-(carboxy)-1'-(methyl)ethylthio]-3R-phthalimidoazetidin-4-one;

2S-[1',1'-(dimethyl)-2'-(acetamido)-2'-(carboxy)ethylthio]-3R-phthalimidoazetidin-4-one;

2S-[1',1'-(dimethyl)-2'-(hydroxy)-2'-(carboxy)ethylthio]-3R-phthalimidoazetidin-4-one;

and the like.

The free carboxy thioazetidinones of this invention have been discovered to exhibit antibiotic activity against several organisms, including activity against *Bacillus subtilis* and *Serratia marcescens*.

The following examples are provided to further illustrate the compounds of this invention as well as the methods by which they are prepared.

PREPARATION

2-Chloro-3R-phthalimido-1-(1'-methyoxycarbonyl-2'-methylprop-1'-enyl)azetidin-4-one To a solution of methyl 6-phthalimidopenicillanate (51.0 g., 142 mmol.) in 750 ml. of methylene chloride at −80°C. were added, dropwise, 300 ml. of a 1 M solution of chlorine in methylene chloride. The reaction mixture was stirred for 2 hours at −80°C. Stirring was continued for an additional hour as the mixture warmed to room temperature. Evaporation of the solvent *in vacuo* gave the desired olefinic product as a white foam in an excess of 95% yield.

EXAMPLE 1

2-Chloro-1-methoxyoxalyl-3R-phthalimidoazetidin-4-one

Ozone was passed through a solution of 2-chloro-3R-phthalimido-1-(1'-methoxycarbonyl-2'-methylprop-1'-enyl)-azetidin-4-one (52.0 g., 141 mmol.) in 1.3 liters of methylene chloride at −20°C. The reaction was discontinued after about 2 hours at which time thin-layer chromatography (tlc) of a sample of the reaction mixture indicated an absence of the olefinic starting material. Sodium bisulfite (30 g.) and 20 ml. of water were added to the reaction mixture, and it was then vigorously stirred and allowed to warm to room temperature. After 1 hour (the reaction mixture being negative to a starch-iodide test), the methylene chloride solution was decanted from the excess $NaHSO_3$. The $NaHSO_3$ solution was washed with 50 ml. methylene chloride. The methylene chloride solutions were combined and washed successively with 300 ml. $NaHSO_3$ solution (10 g. in 300 ml. water), water (2 × 300 ml.), and saturated NaCl solution (400 ml.). After drying over $MgSO_4$, the solvent was evaporated to give 47.7 grams (about 100%) of the glyoxylate product as a white foam: ir ($CHCl_3$) 1850 (oxalyl C=O), 1799 (β-lactam C=O), 1743 and 1778 cm$^{-1}$ (phthalimido C=O); nmr ($CHCl_3$) 240 (3,s,OCH$_3$), 341 (1,d,J = 2.5 Hz, β-lactam H), 374.5 (1,d,J = 2.5 Hz, β-lactam H) and 474 Hz (4,m,ArH).

Anal. calcd. for $C_{14}H_9ClN_2O_6$:
C, 49.94; H, 2.69; N, 8.32; O, 28.51.
Found: C, 49.16; H, 2.88; N, 7.75; O, 28.30%.

EXAMPLE 2

2-Chloro-3R-phthalimidoazetidin-4-one

A solution of 2-chloro-1-methoxyoxalyl-3R-phthalimidoazetidin-4-one (24.0 g., 72 mmol.) and 2,4-dinitrophenylhydrazine (14.2 g., 72 mmol.) in 650 ml. of tetrahydrofuran was refluxed for 35 minutes. The reaction mixture was cooled and evaporated to dryness. Methylene chloride (250 ml.) was added, the mixture was swirled to effect solution, and the red-orange mixture was then evaporated to dryness. The reaction product was then stirred with methylene chloride (200 ml.) and filtered to give 13.4 grams of methyl 2,4-dinitrophenylhydrazineglyoxylate (66%) as a light orange amorphous solid. The filtrate was evaporated to give a light orange foam which was chromatographed on a 5.5 cm. × 26 cm. acid-washed silica gel column (250g. silica gel). The column was eluted with benzene (500 ml.) and then with 20% benzene-ethyl acetate, taking 24 ml. fractions every 10 minutes. Fractions 50–140 were combined and evaporated to a yellow foam which was recrystallized from $CH_2Cl_2$ petroleum ether to give 6.3 grams of 2S-chloro-3R-phthalimidoazetidin-4-one: ir ($CHCl_3$) 1810 (azetidinone C=O); nmr (acetone D-6) 326 (1,d,J = 1.8 Hz, azetidinone H), 368 (1,d,J = 1.8 Hz, azetidinone H) and 273 Hz (4,m,ArH); mass spectrum 214 (M$^+$—HCl).

Anal. calcd. for $C_{11}H_7ClN_2O_3$:
C, 52.71; H, 2.82; N, 11.18; O, 19.15; Cl, 14.14.
Found: C, 52.47; H, 2.72; N, 11.39; O, 19.07; Cl, 14.14%.

A second crop of crystalline product (1.3 grams) was shown by nmr to be about a 1:1 mixture of the 2S-chloro-3R-phthalimidoazetidin-4-one and the corresponding 2R-3R compound. Total yield was 44.5%.

EXAMPLE 3

2-Chloro-3R-phthalimidoazetidin-4-one

To a solution of 1.07 g. (3 mmol.) of 2R-[1'-formyl-1'-(methyl)ethylthio]-3R-phthalimidoazetidin-4-one in 10 ml. of methylene chloride were added 6 ml. (6 mmol.) of a 0.1 M solution of chlorine in methylene chloride. After stirring for 30 min. at room temperature, the solvent was evaporated on a rotavapor, and the residue was dissolved in 5 ml. of methylene chloride. To this solution 9 ml. of petroleum ether were added, and, after 1 hr., 580 mg. of colorless prisms were collected; mp. 154°14 155°. Nmr, ir and mass spectra are virtually identical with those of a sample prepared from 2-chloro-1-methoxyoxalyl-3R-phthalimidoazetidin-4-one and indicate the presence of about a 9:1 ratio of 2S-chloro-3R-phthalimidoazetidin-4-one and 3R-chloro-3R-phthalimidoazetidin-4-one, respectively.

EXAMPLE 4

2S-(Benzhydryloxycarbonylmethylthio)-3R-phthalimidoazetidin-4-one

A solution of 2-chloro-3R-phthalimidoazetidin-4-one (1.0 g., 4 mmol.) in 10 ml. of tetrahydrofuran was added, dropwise, to a mixture of diphenylmethyl mercaptoacetate (1.032 g., 4 mmol.) (from mercaptoacetic acid and diphenyldiazomethane) and triethylamine (.56 ml., 4 mmol.) in 30 ml. of tetrahydrofuran at room temperature. After 30 minutes, the reaction mixture was filtered to give 530 mg. of triethylamine hydrochloride (about 100%). Evaporation of the filtrate in vacuo gave a light colored foam (1.87 g.) of the title compound: nmr ($CHCl_3$) 209(2,s,CH$_2$S), 313(2,s, azetidinone H), 411(1,s, benzhydryl CH), 440(10,s, benzhydryl ArH), 435 (1,s, NH) and 465 Hz (4,m, phthalimido ArH). This product was used without purification to prepare the corresponding free acid.

EXAMPLE 5

2S-(Carboxymethylthio)-3R-phthalimidoazetidin-4-one

To a stirred mixture of anisole (1.3 ml.), trifluoroacetic acid (6 ml.), and 98–100 formic acid (6 ml.) at 0°C. was added 2S-(benzhydryloxycarbonylmethylthio)-3R-phthalimidoazetidin-4-one (1.87 g., 3.9 mmol.). After 17 minutes at 0°C., the reaction mixture was evaporated in vacuo to dryness. The crude product mixture was taken up in 25 ml. of ethyl acetate and was again evaporated to dryness. This was repeated three times. The crude product was then taken up in 80 ml. of ethyl acetate, and the ethyl acetate solution was washed with water (2 × 40 ml.). The organic layer was then extracted with saturated sodium bicarbonate solution (2 × 40 ml.) and water (40 ml.). The basic aqueous extracts were combined and washed with ethyl acetate (80 ml.). The aqueous layer was then stirred with 80 ml. of ethyl acetate, and the pH was adjusted to 3.0 with conc. HCl. The organic layer was then separated, washed with brine (50 ml.), and dried over $MgSO_4$. Evaporation in vacuo gave the acid as a white foam (620 mg., 52% from crude ester); nmr (acetone D-6/$CHCl_3$) 205(2,s,SCH$_2$), 315(2,s, azetidinone H), 365 (1,s,COOH) and 465 Hz (4,s,ArH); mass spectrum 306 (M$^+$), 265 (M$^+$—CONH) and 214(M$^+$—HSCH$_2$COOH).

Anal. calcd. for $C_{13}H_{10}N_2O_5S$:
  C, 50.98; H, 3.29; N, 9.15.
  Found: C, 50.74; H, 3.57; N, 8.95%.

EXAMPLE 6

2S[1'-(Benzhydryloxycarbonyl)ethylthio]-3R-phthalimidoazetidin-4-one

A solution of 2-chloro-3R-phthalimidoazetidin-4-one (1.0 g., 4 mmol.) in 10 ml. of tetrahydrofuran was added, dropwise, in 5 minutes to a mixture of diphenylmethyl 2-mercaptopropionate (1.12 g., 4 mmol.) and triethylamine (0.56 ml., 4 mmol.) in 40 ml. of tetrahydrofuran. After 45 minutes, the reaction mixture was filtered to give 520 mg. of triethylamine hydrochloride (about 95%). The filtrate was evaporated in vacuo to give crude 2S-[1'-(benzhydryloxycarbonyl)ethylthio]-3R-phthalimidoazetidin-4-one (1.77 g.), a small portion of which was recrystallized from $CHCl_3$/petroleum ether as a white microcrystalline solid: ir (mull) 3385(NH) and 1785 cm$^{-1}$ (azetidinone C=O); nmr* ($CDCl_3$) 90(3,d,J = 7.6 Hz, $CH_3$), 217(1,q,J = 7.6 Hz,SCH), 309(2,q,J = 2.4 and 3.2 Hz, azetidinone H), 334(1, m,NH), 408(1,s, benzhydryl CH), 436(10s, benzhydryl ArH) and 464 Hz (4,m, phthalimido ArH); mass spectrum 486($M^+$) and 443 ($m^+$—CONH).

*Since this sample is a mixture of optical isomers, several peaks in the nmr spectrum are distorted. Anal. calcd. for $C_{27}H_{22}N_2O_5S$: C, 66.65; H, 4.56; N, 5.76. Found: C, 66.43; H, 4.52; N, 5.83%.

EXAMPLE 7

2S-[1'-(Carboxy)ethylthio]-3R-phthalimidoazetidin-4-one

To a stirred mixture of anisole (1 ml.), trifluoroacetic acid (5 ml.), and 98–100% formic acid (5 ml.) at 0°C. were added 1.6 grams of 2S-[1'-(benzhydryloxycarbonyl)ethylthio]-3R-phthalimidoazetidin-4-one. After 15 minutes at 0°C., the reaction mixture was evaporated to dryness. The product mixture was taken up in 40 ml. of ethyl acetate and washed with water (2 × 30 ml.). The organic layer was then washed with saturated sodium bicarbonate solution (2 × 15 ml.) and water (30 ml.). The basic aqueous extracts were combined and washed with ethyl acetate (50 ml.). The aqueous layer was then slurried with another 50 ml. of ethyl acetate, and the pH was adjusted to about 3 with conc. HCl. The ethyl acetate layer was then separated, washed with brine (40 ml.), and dried over $MgSO_4$. Evaporation of the ethyl acetate gave the acid as a white foam (820 mg.) which was recrystallized from $CHCl_3$/petroleum ether: nmr (acetone D-6) 86 (3,d,J = 7 Hz, $CH_3$), 222 (1,q,J = 7 Hz, SCH), 320 (2, azetidinone multiplet because sample is a mixture of optical isomers), 390 (1, broad s, NH) and 472 Hz (4,m, phthalimido ArH); mass spectrum 320 ($M^+$), 277 ($M^+$—CONH) and 214 [$M^+$—HSCH($CH_3$)COOH].

Anal. calcd. for $C_{14}H_{12}N_2O_5S$:
  C, 52.50; H, 3.78; N, 8.75; O, 24.97; S, 10.01.
  Found: C, 52.32; H, 3.88; N, 8.69; O, 25.08; S, 9.80%.

EXAMPLE 8

2S-[1'-(Benzhydryloxycarbonyl)-1'-(methyl)ethylthio]-3R-phthalimidoazetidin-4-one.

To a stirred solution solution of diphenylmethyl α-mercaptoisobutyrate (from the acid and diphenyldiazomethane) (2.86 g., 10 mmol.) and triethylamine (1.4 ml., 10 mmol.) in 160 ml. of tetrahydrofuran at room temperature was added, dropwise, a solution of 2-chloro-3R-phthalimidoazetidin-4-one in 20 ml. of tetrahydrofuran. After 45 minutes, the reaction mixture was filtered and 1.35 grams of triethylamine hydrochloride recovered. Evaporation of the filtrate gave a light colored foam. Traces of the unreacted mercapto ester were removed from the product by trituration with petroleum ether. The product was characterized by nmr ($CDCl_3$) 96 [6,s, ($CH_3$)$_2$], 301 (1,d,J = 2.5 Hz, azetidinone H), 312 (1,d,J = 2.5 Hz, azetidinone H), 368 (1,, s,NH), 403 (1,s, benzhydryl CH), 436 (10,s, benzhydryl ArH) and 461 Hz (4,m, phthalimido ArH) and was used without further purification to prepare the corresponding acid.

EXAMPLE 9

2S-[1'-(Carboxy)-1'-(methyl)ethylthio]-3R-phthalimidoazetidin-4-one

To a stirred solution of anisole (2 ml.), trifluoroacetic acid (8 ml.) and 98–100% formic acid (2ml.) at −5°C. were added 1.2 grams of crude 2S-[1'-(benzhydryloxycarbonyl)-1'-(methyl)ethylthio]-3R-phthalimidoazetidin-4-one. After 15 minutes, the reaction mixture was evaporated in vacuo to a viscous oil. Ethyl acetacte (20 ml.) was added, and the resulting solution was again evaporated to dryness. The residue was taken up in 40 ml. of ethyl acetate and washed with water (2 × 50 ml.). The organic layer was then extracted with 5% sodium bicarbonate solution (3 × 25 ml.). The bicarbonate extracts were combined, washed with ethyl acetate (40 ml.), and slurried with 40 ml. of fresh ethyl acetate, during which time the pH was adjusted to about 2.5 with conc. HCl. The organic layer was then separated, washed with water (30 ml.), brine (30 ml.), and dried over $MgSO_4$. The solvent was evaporated in vacuo, during which time the acid product precipitated from the solution. Filtration gave 280 mg. (32%) of a white crystalline solid (mp 219°–222°): nmr ($D_2O$) 90 [6,s, ($CH_3$)$_2$], 311 (1,d,J = 2 Hz, azetidinone H), 317 (1,d,J = 2 Hz, azetidinone H), and 468 Hz (4s, phthalimido ArH); ir (KBr) 1765 (azetidinone C=O), 1741 and 1775 (phthalimido C=O) and 1720 cm$^{-1}$ (carboxy C=O); mass spectrum 334 ($M^+$), 291 ($M^+$—CONH) and 214 [$M^+$—HSC($CH_3$)$_2$COOH].

Anal. calcd. for $C_{15}H_{14}N_2O_5S$:
  C, 53.89; H, 4.22; N, 8.38; O, 23.93; S, 9.59.
  Found: C, 53.94; H, 4.50; N, 8.09; O, 24.09; S, 9.04%.

EXAMPLE 10

2S-[1',1'-(Dimethyl)-2'-(acetamido)-2'-benzhydryloxycarbonyl)-ethylthio]-3R-phthalimidoazetidin-4-one.

To a solution of triethylamine (.56 ml., 4 mmol.) and diphenylmethyl N-acetyl penicillamine (1.43 g., 4 mmol.) (from dl N-acetyl penicillamine and diphenyldiazomethane) in 55 ml. tetrahydrofuran at room temperature was added, dropwise, a solution of 2-chloro-3R-phthalimidoazetidin-4-one (1.0 g., 4 mmol.) in 15 ml. tetrahydrofuran. After 40 minutes, the reaction mixture was filtered, and the filtrate was evaporated in vacuo. The resulting crude product was placed on a silica gel column (21 × 2.5 cm., 50 g. silica gel) and eluted successively with benzene (700 ml.), 5% benzene/ethyl acetate (1800 ml.) and 15% benzene/ethyl acetate (1000 ml.). The desired product was eluted after about 400 ml. of the 15% benzene/ethyl acetate was used. The azetidinone benzhydryl ester was isolated as a light yellow amorphous solid. The nmr of this product is consistent with the structure, but, since it is a mixture of optical isomers (from the dl N-acetyl penicillamine used as starting material), specific assignments to each isomer are virtually impossible. Other physical-chemical data confirm the structure: ir (CHCl$_3$) 1770 and 1731 (phthalimido C=O), 1789 (azetidinone C=O), 1720 (carboxy C=O), 1655 (acetamido C=O), and 3429 cm$^{-1}$(NH); mass spectrum 571 (M$^+$) and 528 (M$^+$—CONH).

Anal. calcd. for C$_{31}$H$_{29}$N$_3$O$_6$S:
C, 65.13; H, 5.11; N, 7.35; O, 16.79; S, 5.61.
Found: C, 64.79; H, 5.35; N, 7.41; O, 16.52; S, 5.04%.

EXAMPLE 11

2S-[1',1'-(Dimethyl)-2'-(acetamido)-2'-(carboxy)ethylthio]-3R-phthalimidoazetidin-4-one.

To a mixture of anisole (1.2 ml.), trifluoroacetic acid (5 ml.) and 98–100 formic acid (5 ml.) at 0°C. were added 900 mg. of 2S-[1',1'-(dimethyl)-2'-(acetamido)-2'-(benzhydryloxycarbonyl)ethylthio]-3R-phthalimidoazetidin-4-one. After 20 minutes at 0°C., the reaction mixture was evaporated to dryness. The residue was taken up in ethyl acetate (25 ml.), washed with water (2 × 20 ml.), and extracted with 15% sodium bicarbonate solution (2 × 20 ml.)*. The bicarbonate extracts were combined and washed with ethyl acetate (30 ml.). The aqueous layer was then slurried with 25 ml. of ethyl acetate, and the pH was adjusted to ca. 2.5 with conc. HCl. The organic phase was then separated, washed with water (20 ml.), brine (20 ml.), and dried over MgSO$_4$. Evaporation of the solvent in vacuo gave 72 mg. of a white amorphous solid identified as the desired acid: ir (CHCl$_3$) 1786 azetidinone C=O), 1770 and 1730 (phthalimido C=O), 1720 (carboxy C=O), and 1674 cm$^{-1}$ (acetamido C=O). The nmr (acetone D-6) was complicated by the presence of optical isomers but, nevertheless, agreed with the proposed structure: 78/84/86/92 [6,s, (CH$_3$)$_2$], 108/120 (3,s, acetamido CH$_3$), 275/280/284 (1,d,J = 0 Hz, CHNH), 320 (1,m, acetidinone 2-H), 322 (1,d,J = ca. 3 Hz, azetidinone 3-H), 350 (1, broad s, COOH), 44 (1,d,J = 9 Hz, CHNH), 471 (4, m,ArH) and 486 Hz (1, broad s, azetidinone NH). Found: C, 53.51; H, 5.51; N, 9.97; O, 23.51; S, 7.32%. *No starting material was found in the 720 mg. of material isolated from the neutrals.

Anal. calcd. for C$_{18}$H$_{19}$N$_3$O$_6$S:
C, 53.33; H, 4.72; N, 10.36; O, 23.68; S, 7.91.
Found: C, 53.51; H, 5.51; N, 9.97; O, 23.51; S, 7.32%.

We claim:
1. A compound of the formula

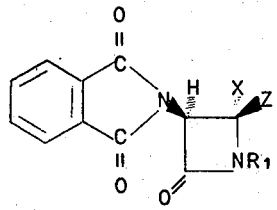

in which R$_1$ is hydrogen or a group of the formula

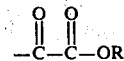

in which
R is a carboxy protecting group;
Z is hydrogen, chlorine, or bromine; and
X is hydrogen, chlorine, bromine, or a group of the formula

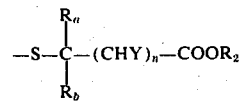

in which R$_a$ and R$_b$ independently are hydrogen or methyl, Y is acetamido or hydroxyl, n is zero or 1, and R$_2$ is hydrogen or a carboxy protecting group readily cleavable by known de-esterification procedures; with the limitation that one of X and Z is hydrogen, and, with the further limitation that, when R$_1$ is

one of X and Z is chlorine or bromine.

2. Compound of claim 1, in which R$_1$ is hydrogen and X or Z is chlorine or bromine.
3. Compound of claim 2, in which X is chlorine.
4. Compound of claim 2, in which X is bromine.
5. Compound of claim 1, in which X or Z is chlorine or bromine and R$_1$ is

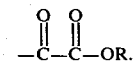

6. Compound of claim 5, in which R is C$_1$ to C$_4$ alkyl, 2,2,2-trihaloethyl, benzyl, p-nitrobenzyl, succinimidomethyl, phthalimidomethyl, p-methoxybenzyl, benzhydryl, C$_2$ to C$_6$ alkanoyloxymethyl, phenacyl, or p-halophenacyl.
7. Compound of claim 5, in which R is methyl, t-butyl, benzyl, p-nitrobenzyl, p-methoxybenzyl, benzhydryl, or 2,2,2-trichloroethyl.
8. Compound of claim 7, in which X is chlorine.
9. Compound of claim 7 in which X is bromine.
10. Compound of claim 1, in which R$_1$ is hydrogen and X is

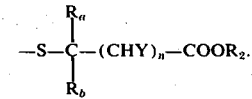

11. Compound of claim 10, in which R$_2$ is a carboxy protecting group which can be cleaved by dilute aqueous base, trifluoroacetic acid, hydrogenation in the presence of a palladium or a rhodium catalyst on a suitable carrier, or reduction by zinc in the presence of an acid.
12. Compound of claim 11, in which R$_2$ is t-butyl, 2,2,2-trichloroethyl, benzyl, p-nitrobenzyl, p-methoxybenzyl, benzhydryl, phthalimidomethyl, or phenacyl.

13. Compound of claim 10, in which $R_a$ and $R_b$ are hydrogen, and $n$ is zero.

14. Compound of claim 10, in which $R_a$ is hydrogen, $R_b$ is methyl, and $n$ is zero.

15. Compound of claim 10, in which $R_a$ and $R_b$ are methyl, and $n$ is zero.

16. Compound of claim 10, in which $R_a$ and $R_b$ are methyl, $n$ is 1, and Y is acetamido.

* * * * *